(12) United States Patent
Morrow et al.

(10) Patent No.: US 8,412,859 B2
(45) Date of Patent: Apr. 2, 2013

(54) METHODS AND SYSTEMS FOR INTERCONNECTING A PERIPHERAL DEVICE AND AN ELECTRONIC SYSTEM

(75) Inventors: Neil Morrow, San Jose, CA (US); Wei Luo, Fremont, CA (US)

(73) Assignee: Maishi Electronic (Shanghai) Ltd., Shanghai (CN)

( * ) Notice: Subject to any disclaimer, the term of this patent is extended or adjusted under 35 U.S.C. 154(b) by 6 days.

(21) Appl. No.: 12/629,320

(22) Filed: Dec. 2, 2009

(65) Prior Publication Data

US 2011/0055432 A1 Mar. 3, 2011

Related U.S. Application Data

(60) Provisional application No. 61/200,691, filed on Dec. 2, 2008.

(51) Int. Cl.
*G06F 3/00* (2006.01)

(52) U.S. Cl. .................................................. 710/9; 710/8
(58) Field of Classification Search .................... None
See application file for complete search history.

(56) References Cited

U.S. PATENT DOCUMENTS

| 5,257,387 A * | 10/1993 | Richek et al. ................. 713/600 |
| 2008/0127165 A1* | 5/2008 | Mullis et al. ................... 717/173 |
| 2010/0125653 A1* | 5/2010 | Cherian et al. ................ 709/223 |

FOREIGN PATENT DOCUMENTS

TW I275956 B 3/2007

* cited by examiner

*Primary Examiner* — Idriss N Alrobaye
*Assistant Examiner* — David Martinez

(57) ABSTRACT

A computer-implemented method for interconnecting a peripheral device and an electronic system includes analyzing an information (INF) file associated with the peripheral device, recognizing a resource conflict between the peripheral device and the electronic system based on the analyzing of the INF file, and resolving the resource conflict by modifying the INF file.

23 Claims, 6 Drawing Sheets

METHODS AND SYSTEMS FOR INTERCONNECTING A PERIPHERAL DEVICE AND AN ELECTRONIC SYSTEM

RELATED APPLICATION

This application claims priority to U.S. Provisional Application No. 61/200,691, filed on Dec. 2, 2008, which is hereby incorporated by reference in its entirety.

BACKGROUND

A computer system may include input/output accesses for accessing input/output peripheral devices, such as Compact Flash devices and Personal Computer (PC) Card devices. Some devices and corresponding software components (e.g., corresponding device controllers) that use the input/output accesses rely on availability of addresses of input/output access for operation. The addresses for some legacy peripheral devices, e.g., those complying with the Personal Computer Memory Card International Association (PCMCIA) standard, may be under the address of 0x1000 (a hexadecimal representation of the input/output address).

However, with the advent of Peripheral Component Interconnect (PCI) Express host bus interface technology, input/output accesses under the address of 0x1000 may not be available to device controllers associated with the legacy peripheral devices. In this case, conventional device controllers cannot adapt the legacy peripheral devices to modern computers that comply with the PCI Express standard.

SUMMARY

In one embodiment, a computer-implemented method for interconnecting a peripheral device and an electronic system includes analyzing an information (INF) file associated with the peripheral device, recognizing a resource conflict between the peripheral device and the electronic system based on the analyzing of the INF file, and resolving the resource conflict by modifying the INF file.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
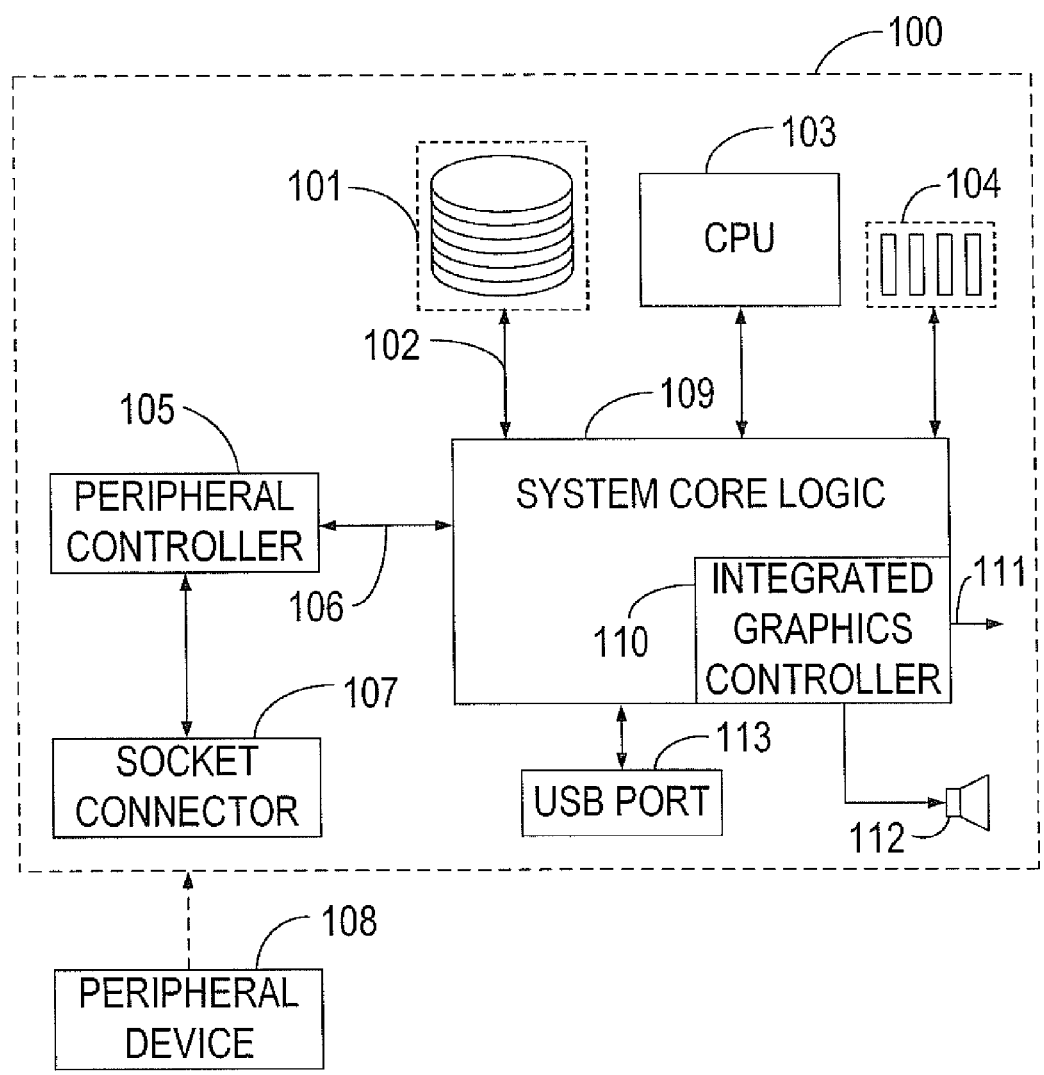
FIG. 1 illustrates a block diagram of an example of an electronic system according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "running," "analyzing," "recognizing," "resolving," "modifying," "defining," "assigning," "updating," "re-enabling," "establishing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides an electronic system, e.g., a computer system, with an inserted peripheral device. The computer system can be a modern computer, e.g., complying with the Peripheral Component Interconnect (PCI) Express standard. The inserted peripheral device can be a modern peripheral device, e.g., complying with the PCI Express standard, or a legacy peripheral device, e.g., complying with Personal Computer Memory Card International Association (PCMCIA) standard. If the inserted peripheral device is a modern peripheral device, the computer system can communicate with the modern peripheral device properly. If the inserted peripheral device is a legacy peripheral device, the computer system can run enhancement software to resolve a resource conflict that may exist between the legacy peripheral device and the computer system. As such, the computer system can also properly communicate with the legacy peripheral device.

FIG. 1 illustrates a block diagram of an example of an electronic system 100, in accordance with one embodiment of the present invention. The electronic system 100 can be, but is not limited to, a computer system. The computer system 100 can be a personal computer (PC) system, such as a desktop computer, a laptop computer, a desktop workstation, or a server computer, that has a PCI Express bus. In one such embodiment, the computer system 100 includes a central processing unit (CPU) 103, a hard disk drive (HDD) 101, a system memory 104, a system core logic chipset 109 (hereinafter, system core logic 109), a peripheral controller 105, a connector, e.g., a socket connector 107, a port, a cable (not shown in FIG. 1), etc., an audio output device 112, and a universal serial bus (USB) port 113. A peripheral device 108 can be coupled to the computer system 100 via the connector, e.g. the socket connector 107. The peripheral device 108 can be a USB device, a local area network (LAN) device, a Compact Flash device, a PC card device, etc.

The CPU 103 can be cooperated with a basic input/output system (BIOS) and an operating system (OS) to manage devices in the computer system 100 by executing instructions and processing the data contained in computer programs. The operating system can be stored in the hard disk drive 101. The hard disk drive 101 can be coupled to other devices in the computer system 100, e.g., via a Serial Advanced Technology Attachment (SATA) electrical interface 102.

The system core logic 109 includes one or more components that process input/output data exchange and memory access exchange between system components in the computer system 100. The system core logic 109 can also include an integrated graphics controller 110 for generating and transmitting a video output 111, such as a Digital Visual Interface (DVI) video output.

The socket connector 107 is operable for connecting various peripheral devices 108 to the computer system 100. The socket connector 107 can receive electrical signals generated by the peripheral controller 105. The peripheral controller 105 is coupled to the system core logic 109 and can communicate with the system core logic 109 via a host bus interface 106. In one embodiment, the peripheral device 108 complies with a first protocol standard, e.g., the PCMCIA standard, PC Card standard, or Compact Flash standard. The peripheral controller 105 can recognize various peripheral devices, e.g., PC Card devices and/or Compact Flash devices complying with the PCMCIA standard, or PCI Express devices complying with the PCI Express standard. However, the host bus interface 106 complies with a second protocol standard, e.g., the PCI Express standard, that is different from the first protocol standard, e.g., the PCMCIA standard.

Advantageously, the peripheral controller 105 can use enhancement software to adapt the peripheral device 108 that complies with the first protocol standard, e.g., the PCMCIA standard, to the host bus interface 106 that complies with the second, different protocol standard, e.g. the PCI Express standard. More specifically, the enhancement software can be notified that the peripheral device 108 has been attached and can automatically update information files (INF files) associated with a software device driver for the peripheral device 108. Thus, the computer system 100 can accommodate re-assignment of the input/output resources for the peripheral device 108 so as to match the resource availability of the computer system 100. The enhancement software can be stored in hard disk drive 101, in one embodiment.

Figure 2:
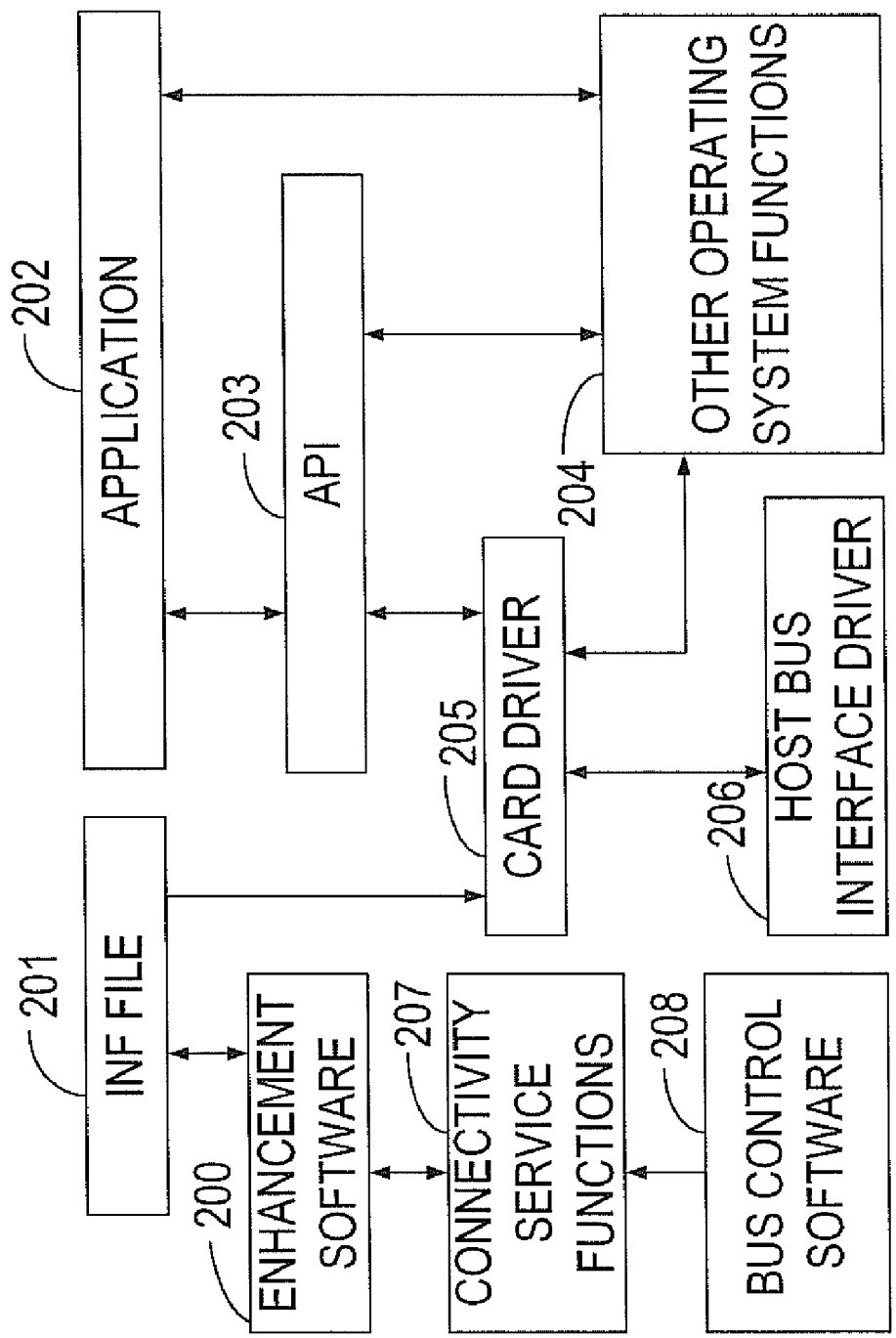
FIG. 2 illustrates an example of a software topology diagram for the electronic system, in accordance with one embodiment of the present invention.

FIG. 2 illustrates an example of a software topology diagram for the computer system 100, in accordance with one embodiment of the present invention. FIG. 2 is described in combination with FIG. 1. As shown in FIG. 2, the software topology diagram includes an information (INF) file 201, enhancement software 200, connectivity service software 207 (e.g., including one or more operating system connectivity service functions), bus control software 208 (e.g., including one or more bus control functions), a software device driver 205 (e.g., a card driver), a host bus interface driver 206, an application program 202 (hereinafter, application 202), an application programming interface (API) 203, and other operating system software 204 (e.g., including other operating system functions).

The CPU 103 in the computer system 100 can execute the machine instructions (or software instructions) in the enhancement software 200. In one embodiment, software instructions 200 are stored in the hard disk drive 101. In addition, the software instructions 200 are copied to the system memory 104 during a normal operation, and are identified by file extensions such as ".SYS" and ".EXE".

The enhancement software 200 can communicate with the connectivity service software (or functions) 207 to receive a notification, such as a notification indicating that the peripheral device 108 has been inserted or removed. When the peripheral device 108 is inserted into the computer system 100, the enhancement software 200 communicates with the bus control software 208 via the connectivity service software 207, so as to handle lower level commands for interconnecting the peripheral device 108 and the computer system 100. The lower level commands are handled by means of controlling electrical signals and performing software tasks, such as assigning system resources. By communicating with the bus control software 208, the enhancement software 200 can integrate a software device driver 205, e.g., a card driver associated with the peripheral device 108, into a data flow that the application 202 requires from the INF file 201. As such, the bus control software 208 can be used by the peripheral controller 105 to adapt the peripheral device 108, e.g., a device complying with the PCMCIA standard, to the computer system 100, which complies with, e.g., the PCI Express standard. For example, the bus control software 208 can be used as a PC Card bus control software for adapting a PC Card device to the computer system 100. The bus control software 208 can also be used as Compact Flash bus control software for adapting a Compact Flash device to the computer system 100.

The INF file 201 includes information for the card driver 205 associated with the peripheral device 108. In addition, the INF file 201 can include information for the computer system 100 to activate other operating system software (or functions) 204, such as functions for printers and/or speakers. The enhancement software 200 can manually or automatically manipulate the INF file 201 or files corresponding to the peripheral device 108. The INF file 201 can be used by the card driver 205 to communicate configuration data and information data. The card driver 205 can perform accesses, such as memory accesses and/or input/output accesses, to the peripheral device 108 by means of the host bus interface driver 206, or by a transparent method of direct addressing. In one embodiment, the system core logic 109 execute hardware functions of creating PCI Express packets to perform the accesses, such as the memory accesses and/or the input/output accesses, to the peripheral controller 105. In one such embodiment, the card driver 205 does not communicate with the host bus interface driver 206 directly. For example, the card driver 205 can communicate with the host bus interface driver 206 via a PCI Express bus controller (not shown in FIG. 2).

The application 202, e.g., a card software application, can call the API 203, such that the API 203 requires the resources provided by the peripheral device 108. For example, the API 203 is a networking API that achieves access to a small network such as a BLUETOOTH personal area network (PAN) through connections (or connectivity) provided by a controller that can reside on the peripheral device 108 and complies with the first protocol standard, e.g., the PCMCIA standard. The card software application 202 can include a PAN application that runs as a contact organizer application. For example, the card software application 202 collects and manages information, e.g., business information and/or personal contact information, in the PAN. Such information, e.g., the business information and/or the personal contact information, in the PAN is defined or written in a predetermined data structure. The card software application 202 can also include Internet access software applications, such as a Web browser, to provide Internet access for the peripheral device 108. For example, the card software application 202 is used as an interface to the networking API 203 and other operation system functions 204, e.g., functions for audio/video coders, functions for audio/video de-coders, cryptographic functions, etc. In addition, the peripheral device 108 supports a wireless modem function to be connected to, e.g., a local voice/data carrier equipment. By means of a data path, e.g., an access path provided by the card driver 205, Internet access can be provided for the peripheral device 108.

Figure 3:
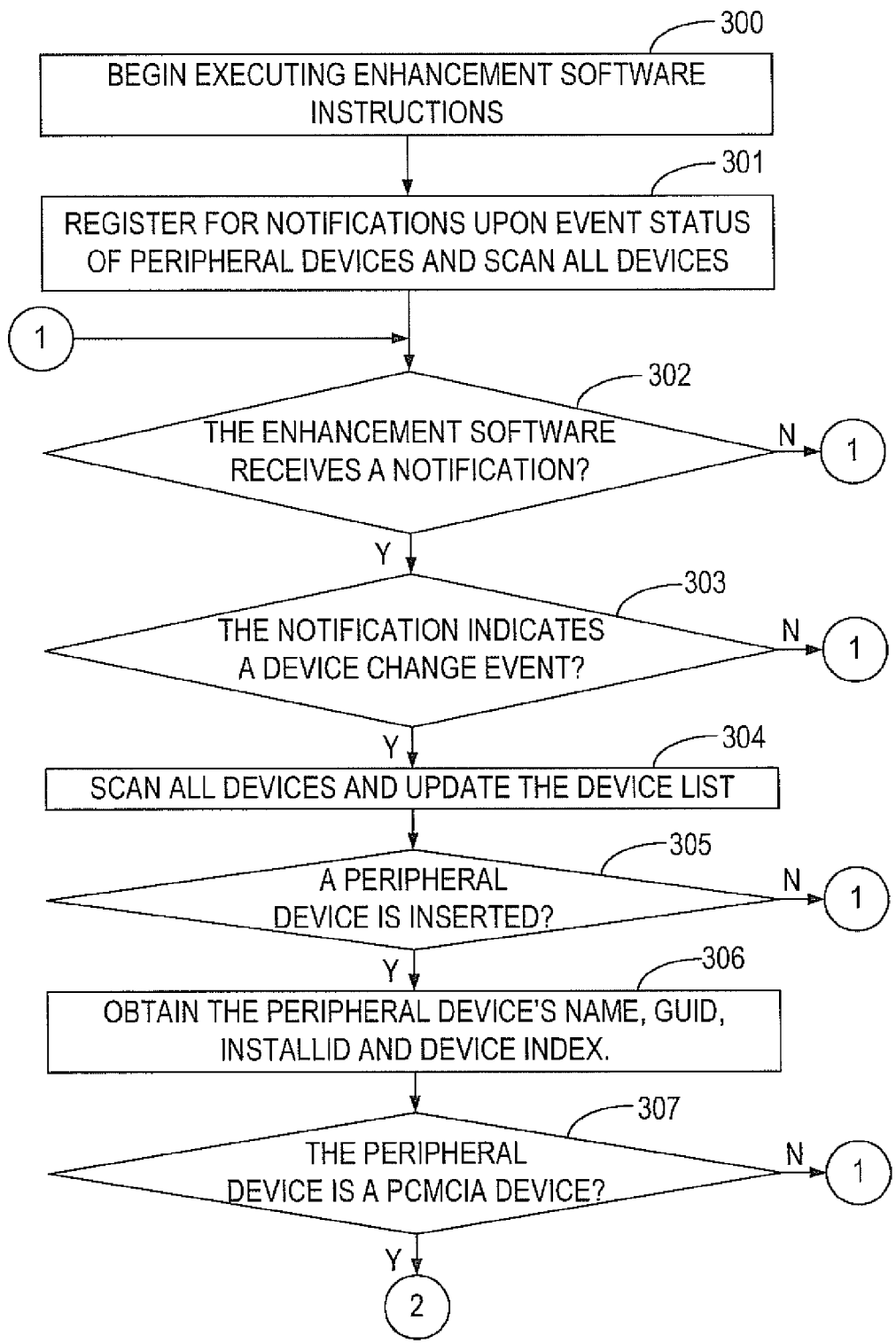
FIG. 3 illustrates a flowchart of examples of operations performed by enhancement software, in accordance with one embodiment of the present invention.
Figure 3:
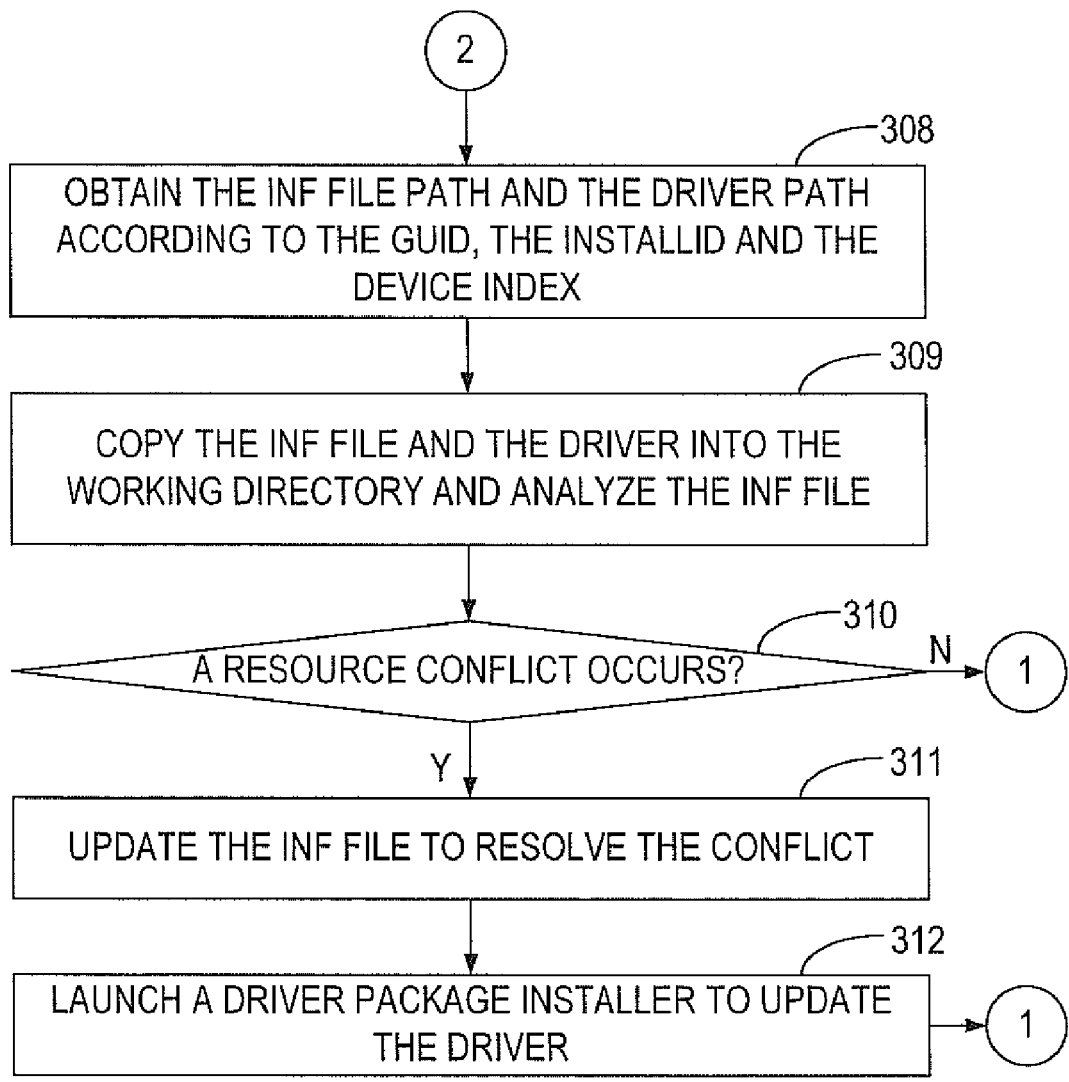

Referring to FIG. 3, a flowchart of examples of operations performed by the enhancement software 200 is illustrated, in accordance with one embodiment of the present invention. The method shown in FIG. 3 is described in combination with the computer system 100 shown in FIG. 1 and the enhancement software 200 shown in FIG. 2. In one embodiment, the flowchart is implemented as computer-executable instructions stored in a computer-readable medium.

At step 300, the enhancement software 200 begins executing enhancement software instructions. For example, after the computer system 100 is turned on and the operating system is loaded, the computer system 100 starts to run the enhancement software 200. The enhancement software 200 begins execution of machine instructions. The enhancement software 200 can automatically run in a background mode, which is not presented to users.

At step 301, the enhancement software 200 communicates with the connectivity service function 207, e.g., requests processing for the connectivity service function 207, to register for notifications based on event status (or conditions) of one or more peripheral devices 108. The notifications, also called event notifications, indicate whether specific events occur. The specific events can include various events such as system events, device change events, etc. The system events can include a power-on event, a shut down event, a standby event, etc. The device change events can include a change in status of the devices in the computer system 100, e.g., a device insertion event, a device removal event, a device loading event, a device unloading event, a change in the number of peripheral devices, etc. For example, a Compact Flash device loading event notification and/or a PC Card device loading event notification can be registered at step 301. Once such a device is inserted or removed, the operating system can send a notification to the enhancement software 200. At step 301, after the notification registration, the enhancement software 200 scans all devices, e.g., including peripheral devices and internal devices, in the computer system 100 to establish a device list.

At step 302, the enhancement software 200 waits for a notification. The notification can be accomplished by an interrupt or a software callback function, for example. When a notification is received, the enhancement software 200 performs step 303 to determine whether the event is a device change event. If the notification does not indicate that a device change event has occurred, the enhancement software 200 performs step 302, waiting for a next notification. If the notification indicates that a device change event has occurred, the enhancement software 200 performs step 304 to scan all of the devices in the computer system 100 and updates the device list.

At step 305, the enhancement software 200 checks if the device change event is that a new peripheral device 108 is inserted. Upon a false notification of a device insertion event, the enhancement software 200 performs step 302, waiting for a next notification. Otherwise, the enhancement software 200 performs step 306 to obtain corresponding device information for the inserted peripheral device 108, such as a device name, a global unique identifier (GUID), an InstallID, a device Index, etc.

At step 307, the enhancement software 200 identifies the type of the peripheral device 108. For example, the enhancement software 200 checks if the peripheral device 108 is a PCMCIA device, e.g., a PC Card device, a Compact Flash device, etc. If the peripheral device 108 is not a PCMCIA device, the enhancement software 200 performs step 302, waiting for a next notification. Otherwise, the enhancement software 200 updates the INF file 201 associated with the peripheral software drivers.

More specifically, the enhancement software 200 performs step 308. At step 308, the enhancement software 200 obtains/gets an INF file path (e.g., a path to the INF file 201) and a driver path (e.g., a path to a device driver 205 associated with the peripheral device 108) according to the device information such as the GUID, the InstallID and the device index obtained at step 306.

At step 309, the enhancement software 200 copies the device driver 205 and the INF file 201 into a working directory, and analyzes the INF file 201. The working directory can be integrated into the operating system to enhance system security. Specifically, the enhancement software 200 can get the device name of the peripheral device 108 and the driver name of the device driver 205 associated with the peripheral device 108 from the INF file 201. If the operating system of the computer system 100 is a Microsoft® operating system, the enhancement software 200 obtains a "LogConfigOverride" section for the peripheral device 108 from the INF file 201, and obtains the "Override" list from the "LogConfigOverride" section. The enhancement software 200 may also obtain associated information from the bus control software 208. Based on an analysis of the INF file 210, e.g., based on the "LogConfigOverride" section, the "Override" list, and the associated information from the bus control software 208, the enhancement software 200 can recognize/determine the type of conflict that may exist. For example, from the "LogConfigOverride" section in the INF file 201, the enhancement software 200 can obtain content, e.g., an IOconfig command (or an IOconfig assignment), which defines a range of an assigned I/O address for the peripheral device 108. According to the content of the IOconfig command/assignment, the enhancement software 200 can determine whether there is a resource conflict, e.g., an input/output (I/O) addressing conflict, between the computer system 100 and the peripheral device 108.

At step 310, based on the analysis result obtained at step 309, the enhancement software 200 determines if a resource conflict, e.g., an I/O addressing conflict, occurs. For example, the enhancement software 200 can determine if the conflict recognized at step 309 includes an I/O addressing conflict between the peripheral device 108 and the computer system 100 due to limitations of I/O addresses in the computer system 100 complying with the PCI Express standard. More specifically, the INF file 201 may select a fixed I/O address, e.g., under 0x1000, for the peripheral device 108 by means of an "IOConfig" instruction for the Microsoft® operating system. When the fixed I/O address is within a certain range, e.g., ranged from 0x0000 to 0x1000, the INF file 201 may exhibit an I/O addressing conflict. If there is no resource conflict, the flowchart returns to step 302 and waits for the next notification.

Advantageously, if a resource conflict occurs, the enhancement software 200 performs step 311 to update/modify the INF file 201 so as to resolve the resource conflict. In one embodiment, by modifying the IOconfig command, the conflicts can be resolved. Specifically, the enhancement software 200 modifies the IOconfig assignment based on a range of available I/O addresses of the computer system 100. As such, according to the modified IOconfig assignment, the operating system assigns a new I/O address that exhibits no conflict with the resource of the computer system 100 to the peripheral device 108. For example, available I/O addresses of the computer system 100 that operates under the Microsoft® operating system and that uses PCI Express host bus interfaces are greater than 0x1000. When the I/O address (e.g., selected according to information in the INF file 201) for the peripheral device 108 is within a range that is below 0x1000, e.g., ranged from 0x0300 to 0x1000, the enhancement software 200 can change the I/O address to be within a range that is greater than 0x1000, e.g., ranged from 0x1000 to 0xFFFF. In one embodiment, the enhancement software 200 changes the content of the original IOconfig assignment. The operating system can assign the I/O address to the peripheral device 108 according to the modified IOConfig assignment. As such, the conflict can be eliminated. In another embodiment, the enhancement software 200 can add a new IOconfig assignment to the INF file 210, such that the operating system assigns a proper I/O address to the peripheral device 108 based on the added IOconfig assignment. Meanwhile, the original IOConfig assignment is removed (e.g., by means of deletion), or labeled as a remark or a comment rather than an instruction (e.g., by adding appropriate syntax in the INF file 201) so that it will be ignored during processing. As such, the resource conflict can also be eliminated.

Following the modification/update of the INF file 201 at step 311, the enhancement software 200 performs step 312. At step 312, the enhancement software 200 launches a driver package installer (e.g., DPInst.exe) to update the device driver 205. For example, the enhancement software 200 instructs the operating system to install, re-install, or remove-then-install the device driver 205. Thus, the computer system 100 can communicate with the peripheral device 108 using the device driver 205. Subsequently, the flowchart returns to the block 302 to wait for a next notification.

In one embodiment, users can follow an on-screen device driver installation wizard to update the device driver 205. In addition, following the update of the device driver 205, the enhancement software 200 can disable the peripheral controller 105, followed by re-enabling the peripheral controller 105, to establish a new logical connection between the peripheral device 108 and the computer system 100.

Figure 4:
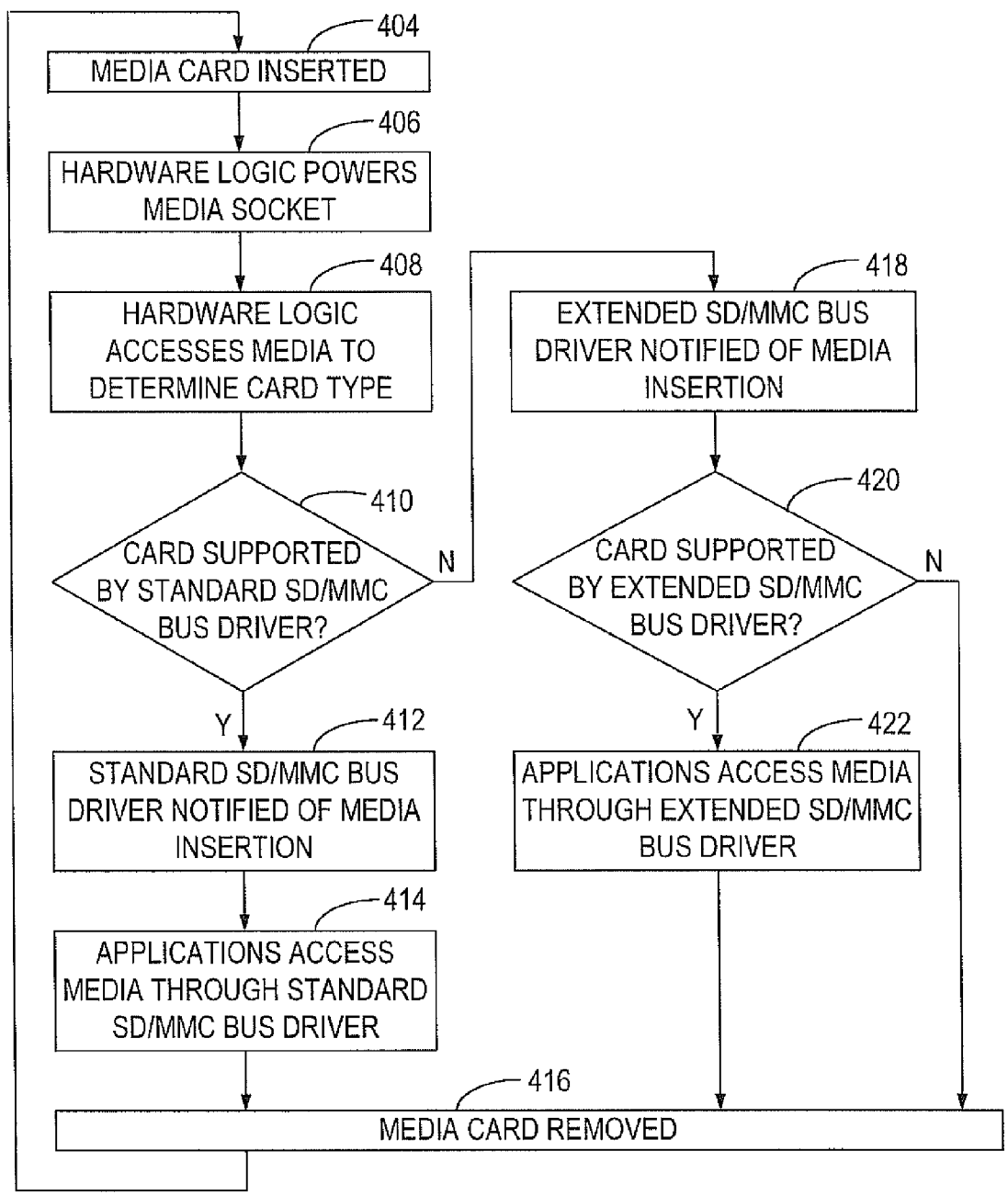
FIG. 4 illustrates a flowchart of examples of operations performed by the electronic system, in accordance with one embodiment of the present invention.

FIG. 4 illustrates a flowchart of examples of operations performed by the computer system 100, in accordance with one embodiment of the present invention. By performing the operations in the flowchart, the computer system 100 can recognize a media card. The method shown in FIG. 4 is described in combination with the computer system 100 shown in FIG. 1 and software, e.g., the enhancement software 200, the host bus interface driver 206, the card driver 205, the application 202, etc., shown in FIG. 2. In order to adapt the peripheral device 108, e.g., a media card, the computer system 100 can first recognize the media card 108 through a corresponding bus driver such as a Secure Digital/MultiMediaCard (SD/MMC) bus driver, when the media card 108 is inserted. As such, the enhancement software 200 and the method shown in FIG. 3 can be used to control the communication between the media card 108 and the computer system 100 through the bus driver.

At step 404 of FIG. 4, the media card 108 is inserted into the media socket 107 of the computer system 100. At step 406, the hardware logic, e.g., the system core logic 109, powers the media socket 107.

At step 408, the hardware logic accesses the media card 108 to determine the card type of the media card 108. According to the type of the media card 108, a corresponding bus driver, e.g., a standard SD/MMC bus driver or an extended SD/MMC bus driver, which can be used to support the media card 108 can be identified. The host bus interface driver 206 shown in FIG. 2 can be the standard SD/MMC bus driver for supporting the media card 108. If the standard SD/MMC bus driver 206 can support the media card 108, the card driver 205 performs accesses, such as memory accesses and/or input/output accesses, to the media card 108 by means of the standard SD/MMC bus driver 206. If the standard SD/MMC bus driver 206 cannot support the media card 108, the extended SD/MMC bus driver (not shown) can be applied. In this case, the card driver 205 can also access the media card 108 through the extended SD/MMC bus driver.

The standard and extended SD/MMC bus drivers both can be notified of the insertion event when the media card 108 is inserted. In one embodiment, it is determined whether the media card 108 can be supported by the standard SD/MMC bus driver 206 at step 410. If the type of the media card 108 can be supported by the standard SD/MMC bus driver 206, then at step 412, the standard SD/MMC bus driver 206 is notified that the media card 108 is inserted. At step 414, applications of the computer system 100, such as the application 202, can access the media card 108 through the standard SD/MMC bus driver 206. Otherwise, the flowchart goes to step 418.

At step 418, the extended SD/MMC bus driver is notified of insertion of the media card 108. When the type of the media card 108 cannot be supported by the standard SD/MMC bus driver 206, the standard SD/MMC bus driver 206 halts access to the standard SD/MMC programming registers. Meanwhile, the extended SD/MMC bus driver is activated to access the media card 108. At step 420, it is determined whether the media card 108 can be supported by the extended SD/MMC bus driver. If the media card 108 is not supported by the extended SD/MMC bus driver, the computer system 100 may not operate the media card 108 until the media card 108 is removed at step 416. Otherwise, the flowchart goes to 422. At step 422, the extended SD/MMC bus driver can support the media card 108, and the application 202 of the computer system 100 can access the media card 108 through the extended SD/MMC bus driver.

Figure 5:
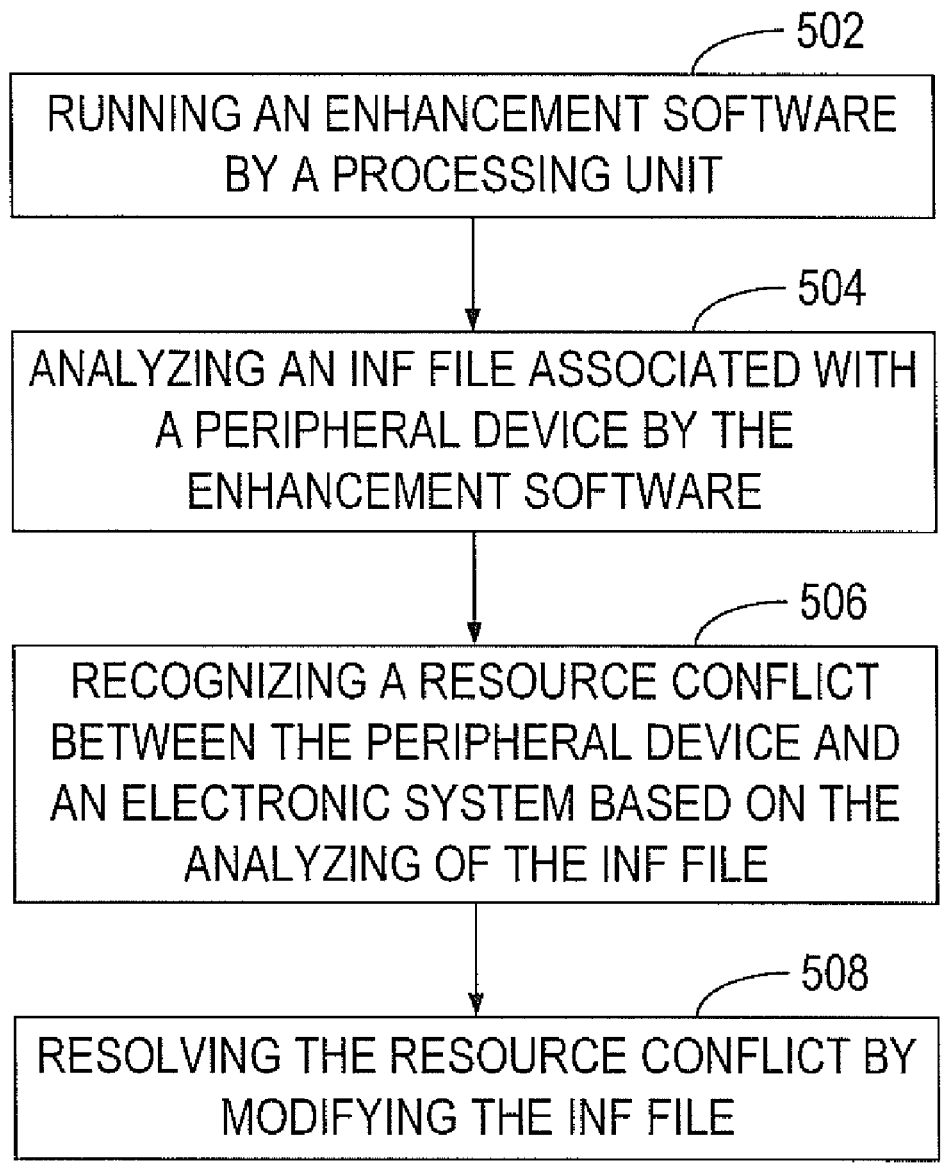
FIG. 5 illustrates a flowchart of examples of operations performed by the electronic system, in accordance with one embodiment of the present invention.

FIG. 5 illustrates a flowchart of examples of operations performed by the computer system 100, in accordance with one embodiment of the present invention. FIG. 5 is described in combination with FIG. 1, FIG. 2, and FIG. 3.

In block 502, the central processing unit (CPU) 103 runs the enhancement software 200. As such, the enhancement software 200 performs the operations described in blocks 504, 506, and 508.

Specifically, in block 504, the enhancement software 200 analyzes the INF file 201 associated with the peripheral device 108.

In block 506, the enhancement software 200 recognizes/determines a resource conflict, e.g., an I/O addressing conflict, between the peripheral device 108 and an electronic system, e.g., the computer system 100, based on the analyzing of the INF file 201.

In block 508, the enhancement software 200 resolves the resource conflict by modifying the INF file 201.

In summary, embodiments according to the present invention provide a computer system that can connect with a peripheral device. The peripheral device complies with a first protocol standard, e.g., the PCMCIA standard. The computer system complies with a second protocol standard, e.g., the PCI Express standard, that is different from the first protocol standard. The computer system can run enhancement software to determine whether a resource conflict occurs by analyzing an INF file associated with the peripheral device. If a resource conflict occurs, the enhancement software can modify the INF file based on a range of available addresses of the computer system, and update a software device driver associated the peripheral device based on the modification of the INF file. After that, the enhancement software can further re-enable a peripheral controller for adapting the peripheral device to the computer system. As a result, the computer system can communicate with the peripheral device properly. Advantageously, the compatibility of the computer system with different protocols can be expanded.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A computer-implemented method for interconnecting a peripheral device and an electronic system, comprising:
    obtaining content from an information (INF) file associated with said peripheral device, wherein said content defines a range of an assigned input/output address for said peripheral device, wherein if said peripheral device complies with the Peripheral Component Interconnect (PCI) Express standard, then said assigned input/output address for said peripheral device is within a first range;
    recognizing a resource conflict between said peripheral device and said electronic system by analyzing said content in said INF file, wherein said resource conflict occurs if said content indicates that said assigned input/output address for said peripheral device is within a second range;
    resolving said resource conflict by modifying said INF file to assign a new input/output address within said first range to said peripheral device; and
    updating a device driver associated with said peripheral device.

2. The computer-implemented method as claimed in claim 1, wherein said resource conflict comprises an input/output addressing conflict.

3. The computer-implemented method as claimed in claim 1, wherein said electronic system and said peripheral device comply with different protocol standards.

4. The computer-implemented method as claimed in claim 1, wherein said resolving said resource conflict comprises:
    modifying said content based on said first range, wherein said first range is a range of an available input/output address of said electronic system and said first range is different from said second range; and
    assigning said new input/output address to said peripheral device according to the modified content.

5. The computer-implemented method as claimed in claim 1, further comprising:
    disabling then re-enabling a peripheral controller after said updating of said device driver; and
    establishing a logical connection between said peripheral device and said electronic system using the updated device driver.

6. The computer-implemented method as claimed in claim 1, further comprising said electronic system identifying the type of said peripheral device.

7. The computer-implemented method as claimed in claim 1, wherein if said peripheral device complies with the Personal Computer Memory Card International Association (PCMCIA) standard, then said assigned input/output address for said peripheral device is within said second range.

8. The computer-implemented method as claimed in claim 1, wherein said INF file comprises information for said device driver.

9. A computer-readable storage medium having computer-executable components stored thereon, for interconnecting a peripheral device and an electronic system, said computer-executable components comprising:
    an information (INF) file associated with said peripheral device;

software that obtains content from said INF file, recognizes a resource conflict between said peripheral device and said electronic system by analyzing said content in said INF file, and resolves said resource conflict by modifying said INF file to assign a new input/output address to said peripheral device, wherein said content defines a range of an assigned input/output address for said peripheral device, if said peripheral device complies with the Peripheral Component Interconnect (PCI) Express standard, then said assigned input/output address for said peripheral device is within a first range, wherein said resource conflict occurs if said content indicates that said assigned input/output address for said peripheral device is within a second range, and wherein said new input/output address is within said first range; and a software device driver associated with said peripheral device, wherein said software updates said software device driver following a modification of said INF file.

10. The computer-readable storage medium as claimed in claim 9, wherein said resource conflict comprise an input/output addressing conflict.

11. The computer-readable storage medium as claimed in claim 9, wherein said electronic system comprises a computer system.

12. The computer-readable storage medium as claimed in claim 9, wherein if said peripheral device complies with the Personal Computer Memory Card International Association (PCMCIA) standard, then said assigned input/output address for said peripheral device is within said second range.

13. The computer-readable storage medium as claimed in claim 9, wherein said electronic system complies with the Peripheral Component Interconnect (PCI) Express standard.

14. The computer-readable storage medium as claimed in claim 9, wherein said INF file comprises information for said software device driver.

15. The computer-readable storage medium as claimed in claim 9, wherein said software modifies said content based on said first range, wherein said first range is a range of an available input/output address of said electronic system and is different from said second range, and wherein said electronic system assigns said new input/output address to said peripheral device according to the modified content.

16. The computer-readable storage medium as claimed in claim 9, wherein said electronic system disables then re-enables a peripheral controller after said update of said software device driver to establish a logical connection between said peripheral device and said electronic system using the updated software device driver.

17. An electronic system comprising:
a processing unit; and
memory coupled to said processing unit, said memory comprising computer-readable instructions that, when executed by said processing unit, cause said electronic system to:

obtain content from an information (INF) file associated with a peripheral device, wherein said content defines a range of an assigned input/output address for said peripheral device, wherein if said peripheral device complies with the Peripheral Component Interconnect (PCI) Express standard, then said assigned input/output address for said peripheral device is within a first range;

recognize a resource conflict between said peripheral device and said electronic system by analyzing said content in said INF file, wherein said resource conflict occurs if said content indicates that said assigned input/output address for said peripheral device is within a second range;

resolve said resource conflict by modifying said INF file to assign a new input/output address within said first range to said peripheral device; and update a software device driver associated with said peripheral device following a modification of said INF file.

18. The electronic system as claimed in claim 17, wherein said resource conflict comprises an input/output addressing conflict.

19. The electronic system as claimed in claim 17, wherein said computer-readable instructions, when executed by said processing unit, also cause said electronic system to modify said content based on a range of an available input/output address of said electronic system and to assign said new input/output address to said peripheral device according to the modified content, wherein said first range comprises said range of said available input/output address.

20. The electronic system as claimed in claim 17, further comprising a peripheral controller coupled to said peripheral device via a connector and coupled to a system core logic via a host bus interface and said peripheral device comply with different protocol standards.

21. The electronic system as claimed in claim 17, wherein said electronic system disables then re-enables a peripheral controller after said update of said software device driver to establish a logical connection between said peripheral device and said electronic system using the updated software device driver.

22. The electronic system as claimed in claim 17, wherein if said peripheral device complies with the Personal Computer Memory Card International Association (PCMCIA) standard, then said assigned input/output address for said peripheral device is within said second range.

23. The electronic system as claimed in claim 17, wherein said INF file comprises information for said software device driver.

* * * * *